US007411936B2

(12) United States Patent
Dixon et al.

(10) Patent No.: US 7,411,936 B2
(45) Date of Patent: Aug. 12, 2008

(54) WIRELESS COMMUNICATION METHOD AND APPARATUS

(75) Inventors: Robert C. Dixon, Palmer Lake, CO (US); Jeffrey S. Vanderpool, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 09/731,329

(22) Filed: Dec. 5, 2000

(65) Prior Publication Data

US 2001/0000136 A1 Apr. 5, 2001

Related U.S. Application Data

(63) Continuation of application No. 08/775,146, filed on Dec. 31, 1996, now abandoned, which is a continuation of application No. 08/767,152, filed on Dec. 16, 1996, now Pat. No. 5,737,324, which is a continuation of application No. 08/536,432, filed on Sep. 29, 1995, now abandoned, which is a continuation of application No. 08/161,187, filed on Dec. 3, 1993, now Pat. No. 5,455,822, which is a continuation of application No. 07/957,457, filed on Oct. 5, 1992, now abandoned, which is a continuation of application No. 07/600,772, filed on Oct. 23, 1990, now abandoned.

(51) Int. Cl.
*H04B 7/216* (2006.01)

(52) U.S. Cl. ..................................... 370/342; 370/441

(58) Field of Classification Search ................ 370/204, 370/280, 310, 328, 329, 335, 336, 341, 342, 370/345–348, 350, 479, 498, 503, 913, 915, 370/441–448

See application file for complete search history.

(56) References Cited

U.S. PATENT DOCUMENTS 3,634,627 A * 1/1972 Velentini ................ 179/15 BA (Continued)

FOREIGN PATENT DOCUMENTS

AU 3984485 9/1985

(Continued)

OTHER PUBLICATIONS

Dixon, Robert C., *Spread Spectrum Systems*, (J. Wiley & Sons, 2d ed. 1984).

(Continued)

*Primary Examiner*—Wing F. Chan
*Assistant Examiner*—Hong Sol Cho
(74) *Attorney, Agent, or Firm*—Stuart A. Whittington (57) ABSTRACT

A method for establishing communications between a master unit and a plurality of node units. Of the plurality of node units, K node units are assumed to have established communications with a master unit. A first (K+1) node unit of the plurality of node units, desires to establish communications with the master unit. The method includes transmitting from the master unit, a base-station spread spectrum signal having a common signaling chip code, transmitting from the first node unit a second spread spectrum signal with a first identification code using the common-signaling chip code, transmitting from the master unit a third spread spectrum signal with a master unit identification code, using the common-signaling chip code. The method further includes generating at the first node unit using the master unit identification signal, a master unit chip code for transmitting spread spectrum signals to the master unit. Additionally, the method includes generating, at the master unit using the first identification code, a first node unit chip code for transmitting spread spectrum signals to the first node unit.

12 Claims, 7 Drawing Sheets

U.S. PATENT DOCUMENTS

| | | | |
|---|---|---|---|
| RE27,738 E | 8/1973 | Honma et al. ............... 332/9 R |
| 3,934,203 A | 1/1976 | Schiff ......................... 325/65 |
| 3,978,436 A | 8/1976 | Casanova et al. ......... 333/30 R |
| 4,021,898 A | 5/1977 | Willis et al. ............... 29/25.35 |
| 4,051,448 A | 9/1977 | Coussot ................... 333/30 R |
| 4,090,036 A * | 5/1978 | Stott et al. ................. 370/316 |
| 4,100,498 A | 7/1978 | Alsup et al. .................. 328/14 |
| 4,112,257 A * | 9/1978 | Frost ...................... 179/2 EB |
| 4,131,484 A | 12/1978 | Caruso et al. ................. 134/1 |
| 4,163,944 A | 8/1979 | Chambers et al. ........... 325/446 |
| 4,217,563 A | 8/1980 | Vale ........................... 330/150 |
| 4,222,115 A | 9/1980 | Cooper et al. .................. 375/1 |
| 4,247,942 A | 1/1981 | Hauer ......................... 375/25 |
| 4,301,530 A | 11/1981 | Gutleber |
| 4,314,393 A | 2/1982 | Wakatsuki et al. ......... 29/25.35 |
| 4,355,411 A | 10/1982 | Reudink et al. ............... 455/33 |
| 4,418,393 A | 11/1983 | Zschiele, Jr. ................ 364/724 |
| 4,418,425 A | 11/1983 | Fennel et al. ................. 455/27 |
| 4,432,089 A | 2/1984 | Wurzburg et al. |
| 4,445,256 A | 5/1984 | Huguenin et al. .......... 29/29.35 |
| 4,455,651 A | 6/1984 | Baran |
| 4,456,793 A | 6/1984 | Baker et al. ............... 179/99 R |
| 4,484,028 A | 11/1984 | Kelley et al. ............. 179/2 DP |
| 4,517,679 A | 5/1985 | Clark et al. .................. 375/37 |
| 4,525,835 A | 6/1985 | Vance et al. |
| 4,550,414 A | 10/1985 | Guinon et al. ................. 375/1 |
| 4,561,089 A | 12/1985 | Rouse et al. |
| 4,562,370 A | 12/1985 | Dach ......................... 310/312 |
| 4,563,774 A | 1/1986 | Gloge et al. ................. 455/607 |
| 4,567,588 A | 1/1986 | Jerrim |
| 4,569,062 A | 2/1986 | Dellande et al. ............ 375/117 |
| 4,574,378 A * | 3/1986 | Kobayashi .................. 370/348 |
| 4,583,048 A | 4/1986 | Gumacos et al. ............ 329/122 |
| 4,587,662 A | 5/1986 | Langewellpott ................ 375/1 |
| 4,601,047 A | 7/1986 | Horwitz et al. .............. 375/2.2 |
| 4,601,059 A * | 7/1986 | Gammenthaler ............ 455/517 |
| 4,606,039 A | 8/1986 | Nicolas et al. .................. 375/1 |
| 4,612,637 A | 9/1986 | Davis et al. |
| 4,621,365 A | 11/1986 | Chiu ............................. 375/1 |
| 4,622,854 A | 11/1986 | Locke et al. ................... 73/703 |
| 4,641,317 A | 2/1987 | Fullerton ....................... 375/1 |
| 4,642,505 A | 2/1987 | Arvanitis .................... 310/312 |
| 4,647,863 A | 3/1987 | Skudera et al. ............. 329/112 |
| 4,649,549 A | 3/1987 | Halpern et al. ................ 380/32 |
| 4,653,069 A | 3/1987 | Roeder ........................ 380/31 |
| 4,660,164 A | 4/1987 | Leibowitz .................. 364/728 |
| 4,665,404 A * | 5/1987 | Christy et al. .............. 342/463 |
| 4,672,254 A | 6/1987 | Dolat et al. ............. 310/313 R |
| 4,672,658 A | 6/1987 | Kavehrad et al. ............. 379/63 |
| 4,675,863 A | 6/1987 | Paneth et al. |
| 4,680,785 A | 7/1987 | Akiyama ..................... 379/57 |
| 4,688,210 A | 8/1987 | Eizenhöfer et al. |
| 4,691,326 A | 9/1987 | Tauchiya ....................... 375/1 |
| 4,701,904 A | 10/1987 | Darcie |
| 4,703,474 A | 10/1987 | Foschini et al. |
| 4,707,839 A | 11/1987 | Andren et al. ................. 375/1 |
| 4,718,080 A | 1/1988 | Serrano et al. ................ 379/59 |
| 4,724,435 A | 2/1988 | Moses et al. ........... 340/870.13 |
| 4,736,371 A * | 4/1988 | Tejima et al. ................ 370/236 |
| 4,742,512 A | 5/1988 | Akashi et al. |
| 4,745,378 A | 5/1988 | Niitsuma et al. ............ 333/196 |
| 4,745,628 A | 5/1988 | McDavid et al. .............. 375/39 |
| 4,754,453 A | 6/1988 | Eizenhofer |
| 4,754,473 A | 6/1988 | Edwards ....................... 379/58 |
| 4,759,034 A | 7/1988 | Nagazumi ..................... 375/1 |
| 4,759,078 A | 7/1988 | Schiller ....................... 455/49 |
| 4,763,322 A * | 8/1988 | Eizenhofer .................. 370/95 |
| 4,765,753 A | 8/1988 | Schmidt ...................... 379/60 |
| 4,768,218 A * | 8/1988 | Yorita ........................ 455/463 |
| 4,769,812 A | 9/1988 | Shimizu |
| 4,787,093 A | 11/1988 | Rorden ........................ 375/23 |
| 4,797,947 A | 1/1989 | Labedz ....................... 455/33 |
| 4,800,885 A | 1/1989 | Johnson ..................... 128/633 |
| 4,804,938 A | 2/1989 | Rouse et al. ................ 340/310 |
| 4,805,208 A | 2/1989 | Schwartz ..................... 379/93 |
| 4,807,222 A | 2/1989 | Amitay |
| 4,813,057 A | 3/1989 | Fullerton ..................... 375/37 |
| 4,815,106 A | 3/1989 | Propp et al. ................... 375/36 |
| 4,829,554 A | 5/1989 | Barnes et al. ................. 379/58 |
| 4,833,702 A | 5/1989 | Shitara et al. ................ 379/60 |
| 4,837,786 A | 6/1989 | Gurantz et al. |
| 4,837,802 A | 6/1989 | Higashiyama et al. ........ 379/62 |
| 4,860,307 A | 8/1989 | Nakayama .................... 375/1 |
| 4,866,732 A * | 9/1989 | Carey et al. ................. 375/141 |
| 4,868,811 A * | 9/1989 | Suzuki ....................... 370/436 |
| 4,878,238 A | 10/1989 | Rash et al. .................... 379/62 |
| 4,893,327 A | 1/1990 | Stern et al. .................... 379/59 |
| 4,894,842 A | 1/1990 | Brockhoven et al. ........... 375/1 |
| 4,901,307 A * | 2/1990 | Gilhousen et al. ........... 370/320 |
| 4,905,221 A | 2/1990 | Ichiyoshi |
| 4,912,705 A | 3/1990 | Paneth et al. |
| 4,916,691 A * | 4/1990 | Goodman .................... 370/389 |
| 4,918,689 A | 4/1990 | Hui |
| 4,918,690 A | 4/1990 | Markkula, Jr. et al. |
| 4,943,973 A | 7/1990 | Werner ......................... 375/1 |
| 4,949,395 A | 8/1990 | Rydbeck .................... 370/435 |
| 4,965,759 A | 10/1990 | Uchida et al. ............... 364/604 |
| 4,972,506 A * | 11/1990 | Uddenfeldt ................. 455/33 |
| 4,979,186 A | 12/1990 | Fullerton ..................... 375/23 |
| 4,984,247 A | 1/1991 | Kaufmann et al. ............. 375/1 |
| 4,995,083 A | 2/1991 | Baker et al. .................. 380/23 |
| 5,005,183 A | 4/1991 | Carey et al. ................... 375/1 |
| 5,008,953 A | 4/1991 | Dahlin et al. ................. 455/33 |
| 5,016,255 A | 5/1991 | Dixon et al. ................... 375/1 |
| 5,018,165 A | 5/1991 | Sohner et al. .................. 375/1 |
| 5,022,024 A | 6/1991 | Paneth et al. |
| 5,022,046 A * | 6/1991 | Morrow, Jr. ................. 375/130 |
| 5,022,047 A | 6/1991 | Dixon et al. ................... 375/1 |
| 5,023,887 A | 6/1991 | Takeuchi et al. .............. 375/1 |
| 5,025,452 A | 6/1991 | Sohner et al. .................. 375/1 |
| 5,042,050 A | 8/1991 | Owen ........................... 375/1 |
| 5,042,082 A | 8/1991 | Dahlin ........................ 455/33 |
| 5,056,109 A | 10/1991 | Gilhousen et al. ............. 375/1 |
| 5,073,900 A * | 12/1991 | Mallinckrodt ............... 370/320 |
| 5,093,637 A | 3/1992 | Isota et al. |
| 5,101,501 A | 3/1992 | Gilhousen et al. ............ 455/33 |
| 5,103,459 A * | 4/1992 | Gilhousen et al. ........... 370/206 |
| 5,109,390 A | 4/1992 | Gilhousen et al. ............. 375/1 |
| 5,111,535 A | 5/1992 | Tokunaga ................. 455/33.2 |
| 5,119,375 A | 6/1992 | Paneth et al. |
| 5,121,391 A | 6/1992 | Paneth et al. |
| 5,124,698 A * | 6/1992 | Mustonen ................. 340/7.26 |
| 5,134,710 A * | 7/1992 | .ANG.kerberg ............ 455/41.2 |
| 5,166,929 A | 11/1992 | Lo |
| 5,179,571 A | 1/1993 | Schilling |
| 5,191,597 A | 3/1993 | Ekelund et al. |
| 5,200,956 A | 4/1993 | Pudney et al. |
| 5,229,995 A * | 7/1993 | Strawczynski et al. ...... 370/280 |
| 5,239,572 A | 8/1993 | Saegusa et al. |
| 5,243,641 A | 9/1993 | Evans et al. |
| 5,299,198 A | 3/1994 | Kay et al. |
| 5,303,286 A | 4/1994 | Weideman |
| 5,363,373 A | 11/1994 | Nakahara et al. |
| 5,400,359 A | 3/1995 | Hikoso et al. |
| 5,416,779 A | 5/1995 | Barnes et al. |
| 5,420,851 A | 5/1995 | Seshardi et al. |
| 5,446,727 A | 8/1995 | Bruckert et al. |
| 5,483,668 A * | 1/1996 | Malkamaki et al. ........ 455/33.2 |
| 5,533,013 A * | 7/1996 | Leppanen ................... 370/18 |
| 5,537,397 A * | 7/1996 | Abramson ................... 370/18 |
| 5,670,964 A * | 9/1997 | Dent ......................... 342/457 |
| 5,859,879 A * | 1/1999 | Bolgiano et al. ............ 375/347 |

| | | | | |
|---|---|---|---|---|
| 5,870,674 A | * | 2/1999 | English | 455/432 |
| 5,946,618 A | * | 8/1999 | Agre et al. | 455/428 |
| 6,073,013 A | * | 6/2000 | Agre et al. | 455/428 |
| 6,085,085 A | * | 7/2000 | Blakeney, II et al. | 455/426 |
| 6,208,857 B1 | * | 3/2001 | Agre et al. | 455/428 |

FOREIGN PATENT DOCUMENTS

| WO | WO 93/15573 | 8/1993 |
|---|---|---|
| WO | WO 93/18596 | 9/1993 |
| WO | WO 93/18601 | 9/1993 |
| WO | WO 95/12938 | 5/1995 |

OTHER PUBLICATIONS

Eschenbach, Ralph, "Applications of Spread Spectrum Radio to Indoor Data Communications," *Proc. of the IEEE*, 1982, pp. 34.5-1.

Freret, Payne et al., "Applications of Spread-Spectrum Radio to Wireless Terminal Communications", *Proceedings of the IEEE*, 1980, pp. 69.7.1-69.7.4.

Freret, Payne, "Wireless Terminal Communications Using Spread-Spectrum Radio", *Proceedings of the IEEE*, 1980, pp. 244-248.

Kavehrad, M. et al., "Performance of Low-Complexity Channel Coding and Diversity for Spread Spectrum in Indoor, Wireless Communication", *AT&T Tech. Journal*, 64(8):1927-1965, Oct. 1985.

Kavehrad, M. et al., "Spread Spectrum for Indoor Digital Radio", *IEEE Comm. Mag.*, 25(5):32-40, Jun. 1987.

Kavehrad, Mohsen et al., "Direct Sequence Spread Spectrum with DPSK Modulation and Diversity for Indoor Wireless Communications", *IEEE Trans. on Comms.*, Com-35(2):224-226, Feb. 1987.

Unkauf, Manfred G., "Surface Wave Devices in Spread Spectrum Systems", reprinted in H. Matthews (ed.), *Surface Wave Filters* (Wiley 1977), pp. 477-509.

* cited by examiner

WIRELESS COMMUNICATION METHOD AND APPARATUS

CROSS-REFERENCE TO RELATED APPLICATIONS

This application is a continuation of U.S. application Ser. No. 08/775,146 filed on Dec. 31, 1996 (now abandoned) which is a continuation of U.S. application Ser. No. 08/767,152 filed on Dec. 16, 1996 (now U.S. Pat. No. 5,737,324), which is a continuation of U.S. application Ser. No. 08/536,432 filed Sep. 29, 1995 (now abandoned), which is a continuation of U.S. application Ser. No. 08/161,187 filed Dec. 3, 1993 (now U.S. Pat. No. 5,455,822) which is a continuation of U.S. application Ser. No. 07/957,457 filed Oct. 5, 1992 (now abandoned) which is a continuation of U.S. application Ser. No. 07/600,772 filed Oct. 23, 1990, now abandoned.

BACKGROUND OF THE INVENTION

This invention relates to spread spectrum communications, and more particularly to a method for establishing spread spectrum communications between a base station and a handset.

DESCRIPTION OF THE PRIOR ART

A spread spectrum system is one in which the signal energy is distributed over a frequency spectrum that is much wider than the maximum bandwidth required to transmit the information being sent. Techniques for direct sequence spread spectrum modulation have been developed for several years to ensure, among other benefits, secure communications. Modulation is achieved by mixing the information to be sent with a periodic pseudo-noise (PN) code. The spectral density function for the resulting signal has a $\sin(X)/X$ shape with a very wide bandwidth, as compared to the information, and a lower spectral density function amplitude as compared to the information. This modification of the original spectral density function reduces the signal's sensitivity to in-band interference and jamming, as well as reducing interference to other equipment that is sensitive to radio frequencies. Among the other advantages inherent to a spread spectrum system are selective addressing capabilities, code division multiplexing for multiple access, and highly accurate ranging capabilities.

Due to the encoded nature of the signal, demodulation is a more involved process compared with demodulation schemes associated with traditional communications systems. In this case, demodulation involves a receiver reference code, identical to that transmitted, that synchronizes the receiver with the transmitter. The difficulty with this process is that there is no indication of the degree of non-synchronization between received and reference codes until a very high degree of synchronization is achieved. Additionally, mismatches between transmit and receive oscillators used to generate PN codes tend to cause drift in the synchronization between transmitter and receiver.

A prior art communications system using spread spectrum for a wireless private branch exchange (PBX) is described in U.S. Pat. No. 4,672,658 to Kavehrad et al., issued Jun. 9, 1987, which is incorporated herein by reference. Kavehrad et al. relate to a wireless PBX network wherein direct sequence spread spectrum multiple access is used for voice and data communications to support a plurality of local-local and local-external communications. The PBX network includes a plurality of local user transceivers using a first unique chip sequence pattern for information communication and a second common chip sequence pattern for call set up, and a central PBX having a plurality of PBX transceivers using corresponding chip sequence patterns.

The prior art does not teach a method for establishing spread spectrum communications using a spread spectrum signal which allows the use of one or more common signaling spectrum spreading codes to manage handshaking from a master unit to a plurality of node units, without the use of a separate frequency channel for common signaling, and without requiring a separate time channel for common signaling.

OBJECTS OF THE INVENTION

An object of the invention is to provide a method for establishing communications using spread spectrum signals to communicate between a master unit and a plurality of remote units.

Another object of the invention is to provide for a method for using spread spectrum signals to communicate between a master unit and a plurality of remote units requiring a minimum amount of digital signal processing.

A further object of the invention is to allow use of the same frequency for both common signaling as well as communications.

An additional object of the invention is to allow use of the same frequency and same time slot for both common signaling and communications.

Another object of the invention is to allow access and handshaking of a plurality of node units to a single master unit when no node unit has a-priori knowledge of spectrum spreading or identification codes, time slots, synchronization parameters, or frequencies utilized at the master unit to be accessed.

A still further object of the invention is to allow use of a collision avoidance protocol.

Another object of the invention is to allow the management of simultaneous users on a signal master unit on a common signaling and communication time slot and frequency basis.

Another object of the invention is to allow the node units to have a minimal need for intelligence, processing power, or local synchronized clock sources.

Another object of the invention is to allow the option for using spectrum spreading codes as address codes.

Another object of the invention is to allow node response to a valid signal within a time slot through CDMA, eliminating the need for a highly accurate clock and a level of node complexity and intelligence.

A still further object of the invention is to allow for M-ary data transmission to simplify transceiver complexity in remote node units.

An additional object of the invention is to allow for a network of master units, each communicating with a multiplicity of node units, in a grid which requires only three frequencies in a frequency division multiplex operation.

Another object of the invention is to allow half-duplex communication between master unit and node unit in the same TDMA time slot.

SUMMARY OF THE INVENTION

According to the present invention as embodied and broadly described herein, a method and apparatus for establishing and maintaining handshaking and communications between a master unit and a plurality of N node units, with multiple configurations, is provided. Of the plurality of N node units, K node units, where K<N, are assumed to have established 2 K communications links with a master unit, using up to 2K different spectrum spreading codes to generate up to K different spread spectrum signals to transmit from the master unit to K node units, and K different spread spectrum signals to transmit from K node units to the master unit. A time slot for each of the K linked node units is provided for transmitting and receiving in each of the first K time slots. A total of N time slots, constituting a time frame, are assumed available for communicating and/or initializing communications with the master unit by using time division multiple access. While system capacity allows N node units to establish and maintain simultaneous communications, with a single master unit, the number of node units, X, which may access the master unit is not limited to N, but may be much greater.

In this invention, transmitting and/or receiving in a time slot may include transmitting and/or receiving in a plurality of time slots in a slot position within a frame and/or from frame to frame. Transmitting and/or receiving in a particular time slot also does not limit a time slot to a particular slot position within a frame.

A first node unit, i.e. the (K+1)th node unit, of the plurality of the N node units, of the plurality of X node units about to access the master unit, is assumed to desired to establish communications with, or access, the master unit. The method constitutes handshaking between the (K+1)th node unit and the master unit in an access time slot.

A first embodiment of the present invention implements the (K+1)th time slot as the access slot and (K+1)th communication slot. The (K+1)th time slot may occupy, or float to, any open time slot within the time frame of the N–K open slots, and may change time slots as the number, K, of node units which have established communications links with the master unit, changes. This embodiment comprises several steps, the first of which is transmitting in a (K+1)th time slot from the master unit a mater-initialization spread spectrum signal, CSn1, common to the plurality of X node units.

In response to receiving the master-initialization spread spectrum signal CSn1, in the (K+1)th time slot, the (K+1)th node unit transmits in the (K+1)th time slot a first node-initialization spread spectrum signal, CSn1, which may be the same as, and thus a node retransmission of, the master-initialization spread spectrum signal, CSn1, or which may be a spread spectrum signal having a chip code distinct from the master-initialization spread spectrum signal, CSn1, and common to all master units that the (K+1)th node unit may access. The first node-initialization spread spectrum signal, CSm1, may contain the (K+1)th node unit's identification code as data information modulating the chip sequence for the (K+1)th node-initialization spread spectrum signal.

The master unit receives the first node-initialization spread spectrum signal, CSm1, from the (K+1)th node unit in the (K+1)th time slot, and, in reply, transmits in the (K+1)th time slot a master-identification spread spectrum signal, CSn2, which may be distinct from spread spectrum signal CSn1 but common to all X node units. The master-identification spread spectrum signal contains the master unit's (K+1)th slot identification code as data information modulating the chip sequence for the master-identification spread spectrum signal.

In response to receiving the master-identification spread spectrum signal, CSn2, the (K+1)th node unit may transmit in the (K+1)th time slot a second node-initialization spread spectrum signal, CSm2. The second node-initialization spread spectrum signal, CSm2, may contain (K+1)th node-identification code as data information modulating the chip sequence from the node-initialization spread spectrum signal.

The node-identification spread spectrum signal may have a high degree of uniqueness to the plurality of the N–1 other node units.

The master unit receives the (K+1)th node unit's identification code, and transmits in the (K+1)th time slot a master unit (K+1)th slot communication spread spectrum signal, CMNk+1, generated from a spectrum spreading code derived from the (K+1)th node unit's identification code.

In response to receiving the (K+1)th master identification code in the (K+1)th time slot from the master unit the (K+1)th node unit transmits in the (K+1)th time slot a (K+1)th node unit communication spread spectrum signal, CNMk+1, generated from a spectrum spreading code derived from the (K+1)th master-identification code.

If all node units utilize the same receive spread spectrum code (CMNk+1), the master unit does not necessarily have to derive a spectrum spreading code from the (K+1)th node unit's identification code, but may rather, upon determination by the master unit that the (K+1)th node unit's identification code is valid, transmit a spread spectrum communication signal common to all node units able to access the master unit and rely on address bits within the time slot to maintain synchronization of the node units with the master unit.

In a second embodiment of the present invention, a fixed, or Fth, time slot, such as the 1st or Nth slots of the plurality or N time slots in a time frame, serves as the access slot. The second embodiment comprises of the steps of transmitting in the Fth time slot from the master unit a master-initialization spread spectrum signal, CSn1, common to all node units. The Fth time slot may occupy a fixed time slot within the time frame of the N–K unused time slots, and does not change slots as the number, K, of node units which have established communications links with the master unit, changes.

In response to receiving the master-initialization spread spectrum signal, CSn1, in the Fth time slot, the (K+1)th node unit transmits in the Fth time slot a first and second node-initialization spread spectrum signal, CSm1, CSm2, having the characteristics and properties previously discussed.

The master unit receives the node-initialization spread spectrum signal, CSm, in the Fth time slot from the (K+1)th node unit, and transmits in the Fth time slot a master-identification spread spectrum signal, CSn2, which may be distinct from the master-initialization spread spectrum signal, CSn1, but common to all X node units, and containing the master unit's (K+1)th slot identification code. The master-identification spread spectrum signal. CSn2, may include information directing the (K+1)th node unit as to which time slot and spectrum spreading code to use for communication from the (K+1)th node unit to the master unit.

In response to receiving the master-identification spread spectrum signal, CSn2, the (K+1)th node unit transmits in the Fth time slot the second node-initialization spread spectrum signal, CSm2. The second node-initialization spread spectrum signal, CSm2, is common to all master units that (K+1)th node unit may access, and may contain its (K+1)th node-unit-identification code. The second node-initialization spread spectrum signal, CSm2, may have a high degree of uniqueness to the plurality of the N–1 other node units.

The master unit receives the (K+1)th node unit's identification code from the (K+1)th node unit in the Fth time slot, and transmits in the (K+1)th time slot a master unit (K+1)th slot communication spread spectrum signal, CMNk+1, generated from a spectrum spreading code derived from the (K+1)th node unit's identification code.

In response to receiving the (K+1)th master unit identification code from the master unit in the Fth time slot via the CSn2 spread spectrum signal, the (K+1)th node unit transmits in the (K+1)th time slot a (K+1)th node unit communication spread spectrum signal, CNMk+1, generated from a spectrum spreading code derived from the (K+1)th master unit identification code.

If all node units utilize the same receive spread spectrum code (CMNk+1), the master unit does not necessarily have to derive a spectrum spreading code from the (K+1)th node unit's identification code, but may rather, upon determination by the master unit that the (K+1)th node unit's identification code is valid, transmit a spread spectrum communication signal common to all node units able to access the master unit and rely on address bits within the time slot to maintain synchronization of the node units with the master unit.

As an alternative architecture in this configuration, the (K+1)th node unit may transmit the (K+1)th node unit communication spread spectrum signal in the (K+1)th time slot in response to receiving the master unit (K+1)th slot communication signal in the (K+1)th time slot. In this case, the master unit (K+1)th slot identification signal transmitted in the Fth time slot would not necessarily contain information detailing which time slot of the N-K time slots to use for communication transmissions.

In a third embodiment of the invention, the master unit may function with the initialization, identification, and communication protocols detailed in first and second embodiments, but may be configured to transmit the master-initialization spread spectrum signal, CSn1, in a plurality of vacant (N-K) time slots. If the master unit does transmit in a plurality of vacant (N-K) time slots, then node units (K+1), (K+2), (K+3), . . . , (K+(N-K)) (or N) may access the master unit in the (K+1)th, (K+2)th, (K+3)th, . . . , (K+(N-K)th (or Nth) time slots, respectively or randomly. Therefore, the (K+1)th node unit trying to access the master unit would access the first-time slot immediately available after its initiation of the access attempt, instead of waiting for the (K+1)th or Fth time slot to occur in the next frame.

Thus, if K users are present, the master unit transmits in the 1st through Kth time slots the master unit communication spread spectrum signals, CMN1 through CMNk, pertaining to the 1st through Kth node units, and in the (K+1)th through Nth time slots a master-initialization spread spectrum signal, CSn1, which is common to the plurality, X, of node units that may access the master unit. The master-initialization spread spectrum signal may be distinct from all master or node unit communication and identification spread spectrum signals.

In all three embodiments, if a plurality of up to N-K node units tries to access the master unit sequentially in time, with the period between access attempts being greater than or equal to the slot period, upon reception of the master-initialization spread spectrum signal, CSn1, each node unit will access the open time slot available immediately following its initiation of the access attempt. When the first (K+1)th node unit has accessed the master unit (master unit slot and (K+1)th node unit identification signals are being transmitted in the (K+1)th time slot), the master unit may wait to transmit the (K+2)th through Nth master-identification signals until the (K+1)th slot is occupied with master unit-to-(K+1)th node unit and/or (K+1)th node unit-to-master unit communication signals.

If a plurality of up to N-K node units tries to access the master unit instantaneously (the time period between node unit access attempts being less than the slot period), upon reception of the master-initialization spread spectrum signal, CSn1, each node unit of this plurality of node units will transmit a node-initialization spread spectrum signal, CSm, within the same time slot, thus jamming at least one of the node-initialization spread spectrum signals, CSm, at the master unit. If the master unit does not receive a valid node-initialization spread spectrum signal, CSm, or identification code from a node unit during the time slot, it may cease to transmit any signal in that time slot for a predetermined period of time, or it may transmit a "jammed signal alarm" code through the master unit slot identification signal, CSn2. When a lack of response or a jammed signal alarm code from the master unit is encountered, the node units which tried to access the master unit instantaneously, of the plurality, N-K, of node units, may initiate a node unit internal "wait" state, whose period may be derived from each node unit's identification code. After the wait state period, the plurality of node units which failed to access the master unit may attempt to access it again. Since wait states may be highly unique to each node unit, it is unlikely that the same plurality of node units will jam each other again.

If all N time slots are being used for communication or initialization functions by N node units, then the master-initialization spread spectrum signal, CSn1, is not transmitted by the master unit, and no new node units of the plurality of X-N node units may access the master unit. The master unit may operate such that the Nth time slot may transmit a "busy" alarm to the plurality of N-K node units having not established communications with the master unit such that it informs them that no further access is available at that master unit, thereby allowing only N-1 node units to access the master unit.

Additional objects of the invention and advantages of the invention will be set forth in part in the description which follows, and in part will be obvious from the description or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference will now be made to the present preferred embodiments of the invention, examples of which are illustrated in the accompanying drawings.

The invention disclosed in this patent is related to the inventions disclosed in U.S. Pat. No. 5,022,047 entitled "Spread Spectrum Correlator," by Robert C. Dixon and Jeffrey S. Vanderpool and in U.S. Pat. No. 5,016,255 entitled "Asymmetric Spread Spectrum Correlator," by Robert C. Dixon and Jeffrey S. Vanerpool, which are expressly incorporated herein by reference.

Figure 1:
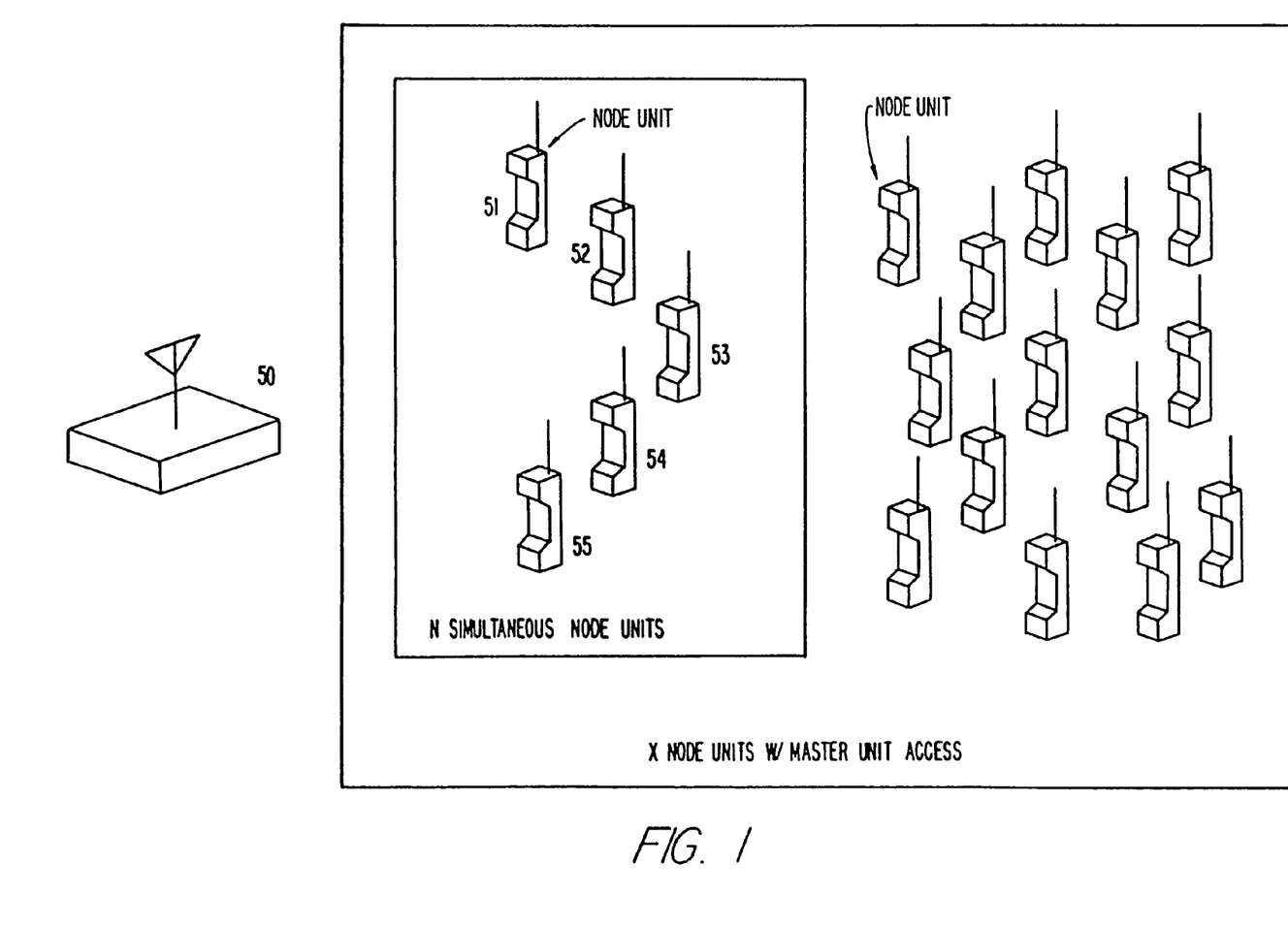
FIG. 1 illustrates a master unit with a plurality of remote units.

In the exemplary arrangement shown in FIG. 1, the present invention includes a method and apparatus for establishing communications between a master unit 50 and N node units. The master unit 50 may be a base station, PBX, file server or other central controlling device serving as the center of a star network, and the node units may be any type of computer, communications, telephone, video or other data device serving as a node point in the start network. While the system capacity allows N node units to establish simultaneous communications with a single master unit, the number, X, of node units that may access the master unit is not limited to N node units, both may be much larger than N.

As illustratively shown in FIG. 1, a master unit 50 is shown with a plurality of N node units 51, 52, 53, 54, 55, where N=5, and a plurality of X node units 56, of which the plurality of N node units is a subset. Of the plurality of N node units 51, 52, 53, 54, 55, three node units (K=3), are assumed to already have established communications channels with the master unit 50 using up to six different spectrum spreading chip codes to generator up to six different spread spectrum signals.

A particular node unit and master unit use two of up to six spectrum spreading chip codes during communications. A first of the two spectrum spreading chip codes is used while communicating from the master unit to the particular node unit. A second of the two spectrum spreading chip codes is used while communicating from the particular node unit to the master unit. The spectrum spreading chip codes may be embodied as a pseudo-random sequence, and the spectrum spreading chip codes typically modulate information data which may be embodied as a data bit sequence, as is well known in the art.

A total of five time slots (N=5), which constitute a time frame, are assumed available for communicating with the master unit by use of time division multiple access. Each of the three node units 51, 52, 53, communicates with the master unit 50 in a time slot, which may be the first three of five time slots. Alternatively, each of the three node units may communicate with the master unit 50 in three time slots which have any predetermined order. Additionally, a (K+1)th time slot, which by way of example is the fourth time slot ($K$+1=4), may occupy, or "float" to, any open time slot within the time frame of the two unused time slots, and may change time slots as the number, K, of node units which have established communications links with the master unit, changes. A node unit, which of the five node units is the fourth node unit, desires to establish communications with, or access the master unit 50.

In the present invention, transmitting and/or receiving in a time slot may include transmitting and/or receiving in a plurality of time slots in a slot position within a frame and/or from frame to frame. Transmitting and/or receiving in a particular time slot also does not limit a time slot to a particular slot position within a frame.

In a first embodiment of the invention, the apparatus and method comprises the steps of transmitting in a (K+1)th time slot from the master unit 50, a master-initialization spread spectrum signal, CSn1. The master-initialization spread spectrum signal uses a master-common-signaling chip code which is known and stored in all the node units able to access the master unit. All of the node units have means responsive to the master-initialization spread spectrum signal, for correlating with the master-common-signaling chip code of the master unit 50. The correlating means may be embodied as a surface acoustic wave device (SAW), digital device, or any other device which can perform the required function. The master-common-signaling chip code may, but is not required to, modulate information data embodied as a data bit sequence or data symbol sequence. The information data may include indexing, addressing, or other data pertinent to the (K+1)th time slot. The entire chip sequence of the master-common-signaling chip code may be transmitted per data bit or data symbol during the (K+1)th time slot from the master unit.

In response to receiving the master-initialization spread spectrum signal, CSn1, at the (K+1)th node unit, the method and apparatus include transmitting from the (K+1)th node unit in the (K+1)th time slot a first node-initialization spread spectrum signal, CSm1. The first node-initialization spread spectrum signal may, but is not required to, retransmit the master-common-signaling chip code which was transmitted from the master unit during the (K+1)th time slot. Alternatively, the first node-initialization spread spectrum signal, CSm1, may use a node-common-signaling chip code which can be received by all master units that the (K+1)th node unit may access. The first node-initialization spread spectrum, CSm1, signal additionally may be modulated by information data, such as the (K+1)th node unit's identification code, or an acknowledgement ("ack") to signal the master unit a node unit desired to establish communications with the master unit, allowing the master to proceed with the exchange of identification and communication information between the master unit an the (K+1)th node unit. The entire chip sequence of the master-common-signaling chip code or node-common-signaling chip code may modulate each bit, or symbol, of the information data, i.e., the node unit's identification code, using spread spectrum modulation.

The master unit 50 receives the first node-initialization spread spectrum signal, CSm1, from the (K+1)th node unit in the (K+1)th time slot, and transmits in the (K+1)th time slot a master-identification spread spectrum signal, CSn2. The master-identification spread spectrum signal uses a master-identification code which is common to all X node units. The master-identification code is modulated by the master-common-signaling chip code or node common-signaling chip code to produce the master-identification spread spectrum signal.

The master-identification code may be unique to the (K+1)th master unit slot, and may be unique to a minimum of N master-identification codes available at the master unit 50. The master-identification code, which may be distinct from all other master-identification codes, and node-identification codes, is used by the node unit for generating a master unit chip code for a spread spectrum signal used to communicate with the master unit 50. The master-unit chip code is generated from an algorithm processing the master-identification code, which may include, for example, a one-to-one relationship for setting taps on a set of shift registers.

In response to receiving the master-identification spread spectrum signal, CSn2, from the master unit 50 in the (K+1)th time slot, the (K+1)th node unit transmits in the (K+1)th time slot a (K+1) node-identification code to the master unit using a second node-initialization spread spectrum signal, CSm2. As described previously for the first node-initialization spread spectrum signal, the second node-initialization spread spectrum signal, CSm2, uses a master-common-signaling chip code; or a node-common-signaling chip code which is common to all master units to which the (K+1) node unit may access for modulating the node-identification code. The (K+1) node-identification code may have a high degree of uniqueness compared with node unit identification codes by which the plurality of other node units may access the master unit.

The master unit 50 receives the (K+1)th node-identification code, and establishes the master-unit-to-(K+1)th-node-unit communication channel by transmitting in the (K+1)th time slot a master-unit-(K+1)th-slot communication spread spectrum signal, CMNK+1. A (K+1)-node-unit chip code for the master unit-(K+1)th slot communication spread spectrum signal may be generated from the (K+1)th node unit identification code.

In response to receiving the (K+1)th master-identification code, the (K+1)th node unit establishes the (K+1)th node-unit-to-master unit communication channel by transmitting in the (K+1)th time slot a (K+1)th node-unit-communication spread spectrum signal, CNMK+1. A master-unit chip code for the (K+1)th node unit communication spread spectrum signal is generated from the (K+1)th master-identification code.

In the explanatory embodiment described herein, the master unit may operate such that it does not transmit in a time slot except to send a plurality of K master unit slot communication spread spectrum signals, CMN1 to CMNK, in K time slots, to K node units which have established communications links with the master unit, plus a master-initialization spread spectrum signal, CSn1, in the case of a search for a new node unit trying to access the master unit, or a master unit slot identification signal, CSn2, in the case of a node unit being in the process of accessing a master unit, leaving N−K−1 time slots unused. If the master unit is transmitting a master-identification spread spectrum signal, CSn2, in the (K+1)th time slot (the (K+1)th node unit is in the process of accessing the master unit), it then may transmit a master-initialization spread spectrum signal, CSn1, in the (K+2)th time slot, in order to allow the (K+2)th node unit to access the master unit through the same method.

If all node units utilize the same receive spread spectrum code (CMNk+1), the master unit does not necessarily have to derive a spectrum spreading code from the (K+1)th node unit's identification code, but may rather, upon determination by the master unit the (K+1)th node unit's identification code is valid, transmit a spread spectrum communication signal common to all node units able to access the master unit and rely on address bits within the time slot to maintain synchronization of the node units with the master unit.

If a plurality of up to N−K node units tries to access the master unit sequentially in time, with the period between access attempts being greater than or equal to the time frame period, upon reception of the master-initialization spread spectrum signal, CSn1, each node unit of the plurality of N−K node units will access the time slot immediately available following its initiation of the access attempt. When the first (K+1)th node unit has accessed the master unit (master unit (K+1)th slot and (K+1)th node unit identification signals are being transmitted in the (K+1)th time slot), the master unit may wait to transmit the (K+2)th master unit slot identification signal until the (K+1)th slot is occupied with master unit-to-(K+1)th node unit and/or (K+1)th node unit-to-master unit communication signals.

If a plurality of up to N−K node units tries to access the master unit instantaneously (the time period between node unit access attempts being less than the frame period), upon reception of the master-initialization spread spectrum signal, CSn1, each node unit of this plurality of node units will transmit a first node initialization spread spectrum signal, CSm1, within the same time slot, thus jamming at least one of the node unit initialization signals, CSm, at the master unit. If the master unit does not receive a valid node-initialization spread spectrum signal, CSm, or identification code from a node unit during the time slot, it may cease to transmit any signal in that time slot for a predetermined period of time, or it may transmit a "jammed signal alarm" code through the master-identification spread spectrum signal, CSn2. When a lack of response or a jammed signal alarm code from the master unit is encountered, the node units which tried to access the master unit instantaneously, of the plurality, N−K, of node units, may then initiate a node unit internal "wait" state, whose period may be derived from each node unit's identification code. After the wait state period, the plurality of node units which failed to access the master unit may attempt to access it again. Since wait states may be highly unique to each node unit, it is unlikely that the same plurality of node units will jam each other again.

If all N time slots are being used for communication or initialization functions by N node units, then the master-initialization spread spectrum signal, CSn1, is not transmitted by the master unit, and no new node units of the plurality of X−N node units may access the master unit until a time slot opens up through one or more of the N node units abandoning communications with the master unit.

As an alternative architecture to the present embodiment, the master unit may operate such that the Nth time slot may be held in reserve to transmit a "busy" alarm to the plurality of N−K node units having not established communications with the master unit such that it informs them that no further access is available at that master unit, thereby allowing only N−1 node units to access the master unit.

Figure 2A:
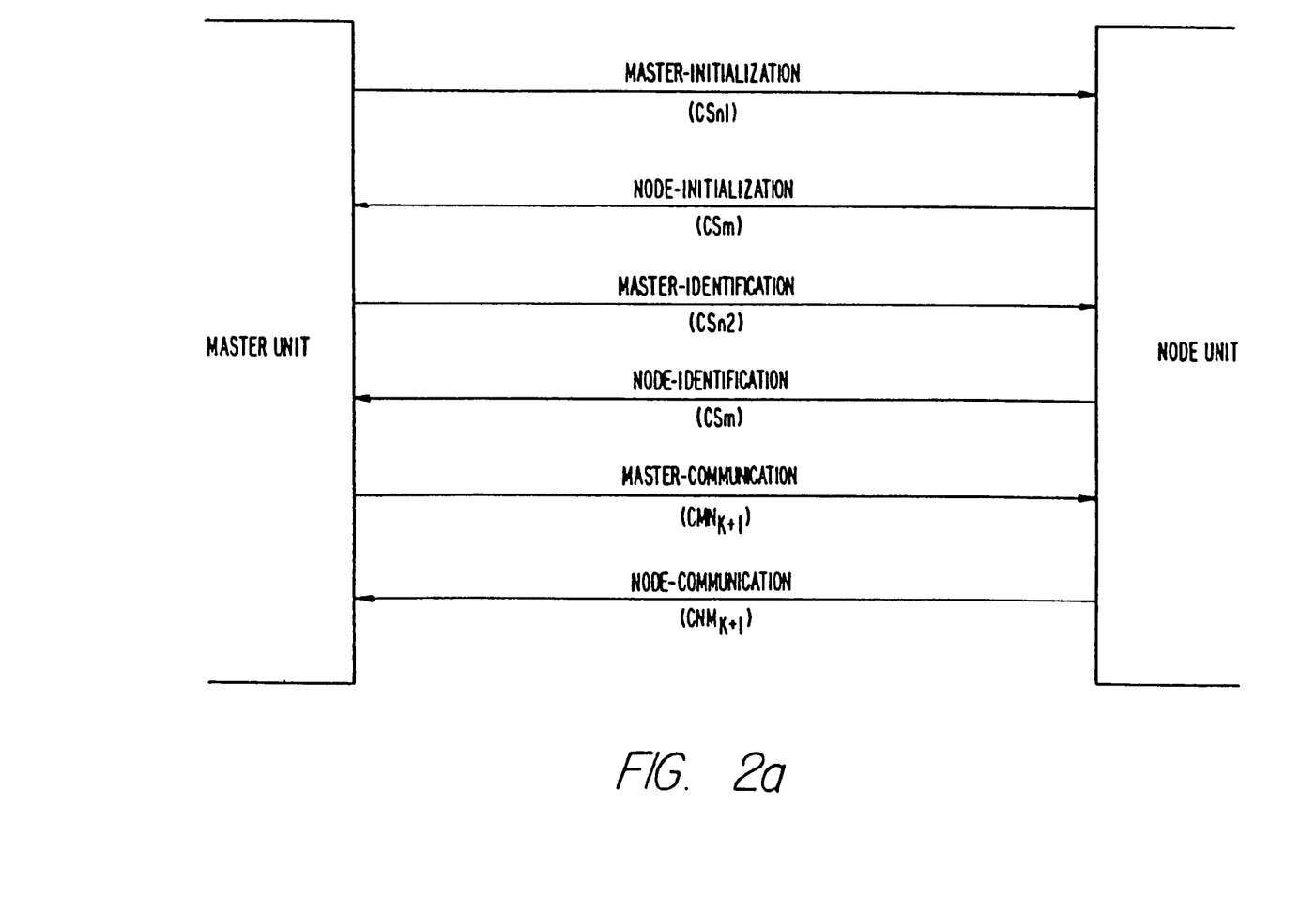
FIGS. 2A and 2B illustrate the protocol of the method of the present invention.
Figure 2B:
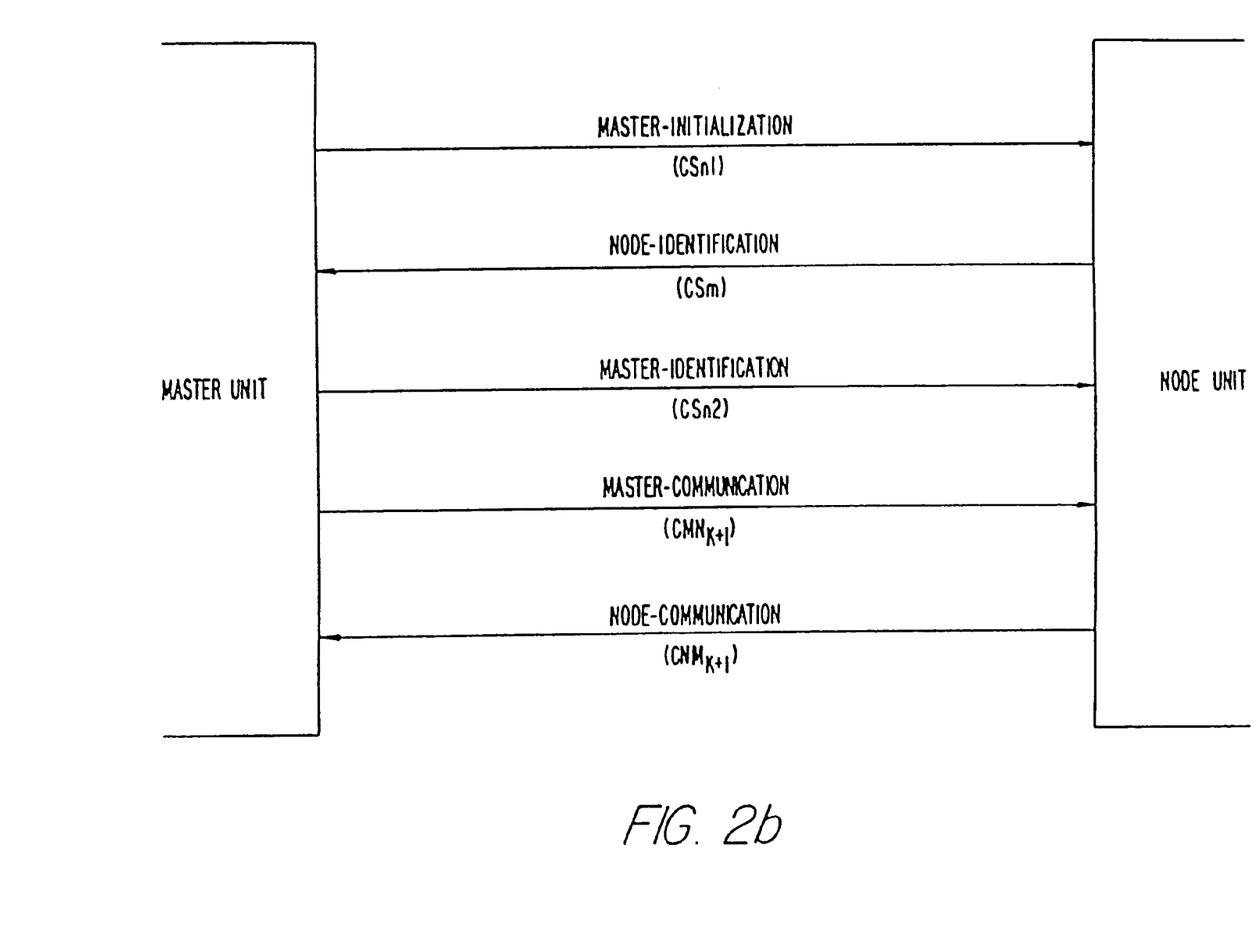

FIGS. 2A and 2B illustrate the foregoing protocol of the present invention.

FIG. 2A illustrates the case when the node unit responds to the master-initialization signal with the node-initialization signal, which may be a simple acknowledgement ("ack"), to advise the master unit of the (K+1)th node unit's presence and desire to establish communications. The master and node units then proceed to exchange identification and communication signals as detailed above.

FIG. 2B illustrates the case where the node unit responds to the master-initialization signal with the node-identification signal, decreasing the time and steps necessary to establish communications between the master unit and the (K+1)th node unit. The master and node units then proceed to exchange identification and communication signals as detailed above.

Figure 3:
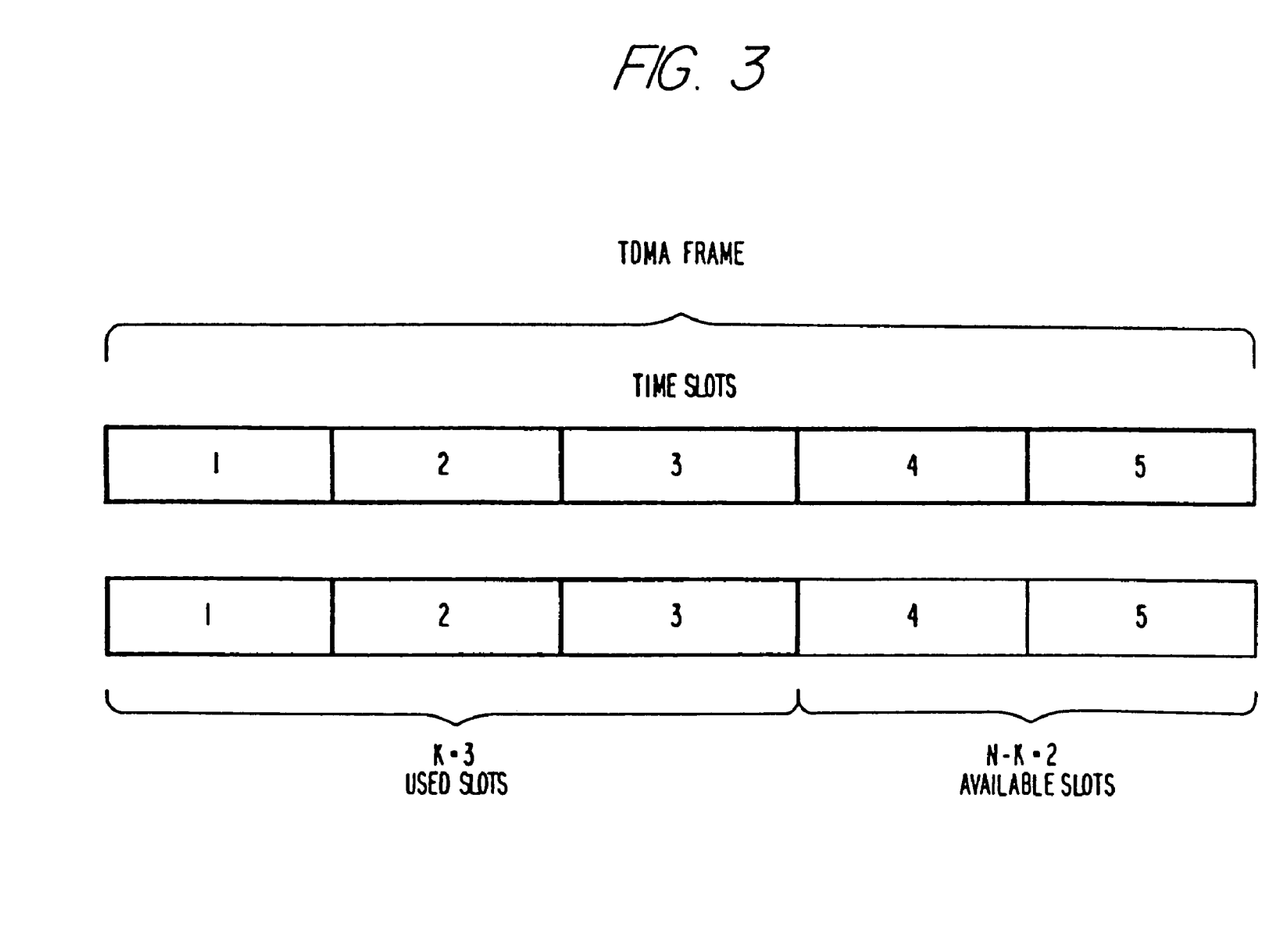
FIG. 3 illustrates time slots.

The time division multiple access frame and time slots of the present invention are illustratively shown in FIG. 3. There are N time slots, with N=5, available from N node units to communicate with the master unit, with K=3 time slots already being used by the first K node units which are communicating with the master unit. During any one or all of the available $$N-K=2$$

time slots, the master unit transmits a master-initialization spread spectrum signal, CSn1, common to the set of X node units that may access the master unit, of which the N=5 node units is a subset. Since all node units which may access the master unit recognize the first master-initialization spread spectrum signal, CSn1, the 4th node unit trying to access the master unit will know that this time slot is available for communicating. In response to receiving the master-initialization spread spectrum signal, CSn1, in the 4th time slot, the 4th node unit may transmit in the 4th time slot to the master unit its identification code or a simple acknowledgement ("ACK") through a first node-initialization spread spectrum signal, CSm1, common to all master units it may access, but distinct from the master-initialization spread spectrum signal, CSn1.

In response to receiving the first node-initialization spread spectrum signal, CSm1, in the 4th time slot from the 4th node unit, the master unit transmits its 4th master-identification code, which may be distinct from all other master and node unit identification codes, with a master-identification spread spectrum signal, CSn2, common to the plurality of node units that may access the master unit and distinct from the master-initialization spread spectrum signal, CSn1, and the first node-initialization spread spectrum signal, CSm1. In response to receiving the 4th master-identification spread spectrum signal, CSn2, the 4th node unit may transmit in the 4th time slot its identification code through the second node-initialization spread spectrum signal, CSm2. In response to receiving the 4th node-identification code, the master unit derives a master unit spectrum spreading communication code for the 4th slot from the 4th node-identification code, and uses it to generate a master unit 4th slot communication spread spectrum signal, CMN4. The 4th master unit slot communication signal, CMN4, is then used for all transmissions from the master unit to the 4th node unit.

If all node units utilize the same receive spread spectrum code (CMN4), the master unit does not necessarily have to derive a spectrum spreading code from the 4th node unit's identification code, but may rather, upon determination by the master unit that the 4th node unit's identification code is valid, transmit a spread spectrum communication signal common to all node units able to access the master and rely on address bits within the time slot to maintain synchronization of the four node units with the master unit.

IN response to receiving the master-identification code for the 4th time slot, the 4th node unit derives a 4th node unit spectrum spreading communication code from the master-identification code, and uses it to generate a 4th node unit communication spread spectrum signal, CNM4. The 4th node unit communication signal, CNM4, is then used for all transmissions from the 4th node unit to the master unit.

Figure 4:
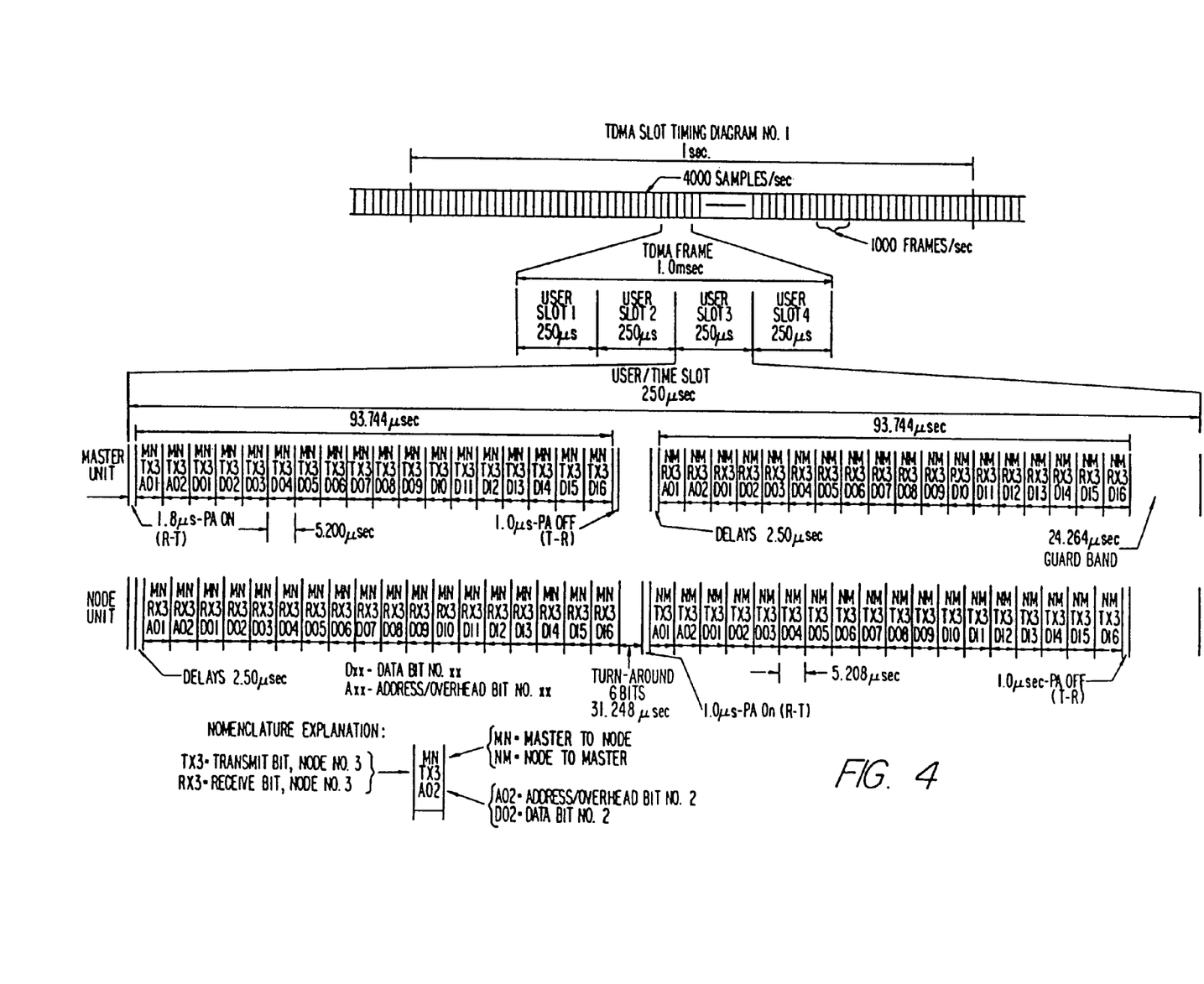
FIG. 4 illustrates the multiple access system timing diagram of a preferred embodiment using binary signaling techniques.

In a particular embodiment, as illustrated in FIG. 4, there may be 4000 samples per second, divided into 1000 frames of four time slots of 250 microseconds each, slowing N=4 users to use one time slot 1000 times per second. The master unit transmits eighteen bits (two overhead/addressing, sixteen data) in each time slot it uses, yielding 16 kbps throughput from the master unit to each node unit per slot, which may be applied as compressed digital voice for a cordless telephone application. In initialization or identification nodes, the eighteen bits may be used differently. Node units, which may be embodied as handsets as illustrated in FIG. 1, transmit eighteen bits per time slot only in response to receiving a spread spectrum initialization, identification, or communication signal from the master unit. The master unit transmission frame comprises four time slots, and is configured such that it does not transmit in a time slot except to send a spread spectrum communication signal to K users who are on line, plus an initialization (in the case of a search for a new node unit trying to access the master unit) or identification (in the case of a new node unit in the process of accessing a master unit) signal, leaving N−K−1 time slots open. If the master unit is transmitting a master-identification spread spectrum signal in the (K+1)th time slot (i.e. the (K+1)th node unit is accessing the system), it then may transmit a master-initialization spread spectrum signal in the (K+2)th time slot, in order to allow the (K+2)th node unit to access the master unit. Thus, if two node units are present, then the master unit transmits in the first through second time slots the communication spread spectrum signals pertaining to the first through second nodes, and in the third time slot an initialization spread spectrum signal common to all node units that may access the master unit, which may be distinct from all communication and identification spread spectrum signals.

If, with n=4 and K=2 node units, a plurality of up to 2 node units try to access the master unit sequentially in time, with the period between access attempts being greater than or equal to the slot period, or 250 microseconds, upon reception of the master-initialization spread spectrum signal, CSn1, the third and fourth node units will access the third and fourth time slots, respectively, immediately available in the first time frame following their respective initiations of the access attempts. When the third node unit has accessed the system (master unit slot and third node unit identification signals are being transmitted in the third time slot), the master unit may wait to transmit the fourth master unit slot identification signal until the third slot is occupied with master unit-to-3rd node unit and/or third node unit-to-master unit communication signals. If, with N=4 and K=2 node units, a plurality of up to two node units tries to access the master unit instantaneously (the time period between node unit access attempts being less than the slot period, or 250 microseconds), upon reception of the master-initialization spread spectrum signal, CSn1, in the third time slot, the third and fourth node units will transmit a first node-initialization spread spectrum signal. CSm1, within the third time slot, thus jamming at least one of the first node-initialization signals, CSm1, at the master unit. If the master unit does not receive a valid initialization signal, CSm, or identification code from a node unit during the third slot, it may cease to transmit any signal in the third time slot for a predetermined period of time, or it may transmit a "jammed signal alarm" code through the master-identification spread spectrum signal, CSn2. When a lack of response or a jammed signal alarm code from the master unit is encountered, the third and fourth node units may then initiate a node unit internal "wait" state, whose period may be derived from each node unit's identification code. After the wait state period, the third and fourth node units may attempt to access it again. Since wait states may be highly unique to each node unit, it is unlikely that the third and fourth node will units jam each other again. If all four time slots are being used for communication or initialization functions by four node units, then the initialization spread spectrum signal, CSn1, is not transmitted by master unit, and no new node units of the plurality of X−4 node units may access the master unit.

With N=4 and K=2, the master unit may function with the initialization, identification, and communication procedures detailed above, but may be configured to transmit the master-initialization spread spectrum signal, CSn1, in the vacant the third and fourth time slots. If the master unit does transmit the third and fourth vacant time slots, node units three and four may access the master unit in the third and fourth time slots, respectively or randomly. Therefore, the third node unit trying to access the master unit would access the first time slot immediately available after its initiation of the access attempt, instead of waiting for the third time slot to occur in the next frame.

Thus, if two users are present, the master unit transmits in the first through second time slots the master unit communication spread spectrum signals, CMN1 through CMN2, pertaining to the first through second node units, and in the third through fourth time slots a master initialization spread spectrum signal, CSn1, common to the plurality, X, of node units that may access the master unit, which may be distinct from all master or node unit communication and identification spread spectrum signals. If two node units try to access the master unit sequentially in time, with the period between access attempts being greater than or equal to the slot period of 250 microseconds, upon reception of the master-initialization spread spectrum signal, CSn1, each node unit will access the open time slot available immediately following its initiation of the access attempt. When the third node unit has accessed the master unit (master unit slot and third node unit identification signals are being transmitted in the third time slot), the master unit may wait to transmit the fourth master unit slot identification signal until the third slot is occupied with master unit-to-4th node unit and/or third node unit-to-master unit communication signals.

If a plurality of up to two node units tries to access the master unit instantaneously (the time period between node unit access attempts being less than the slot period, or 250 microseconds), upon reception of the master-initialization spread spectrum signal, CSn1, the third and fourth node units will transmit a first node-initialization spread spectrum signal, CSM1, or second node-initialization spread spectrum signal, CSm2, within the same time slot, thus jamming at least one of the node-initialization spread spectrum signal or node-identification spread spectrum signal, CSm, at the master unit. If the master unit does not receive a valid node-initialization spread spectrum signal or node-identification spread spectrum signal, CSm1, or identification code from a node unit during the time slot, it may cease to transmit any signal in that time slot for a predetermined period of time, or it may transmit a "jammed signal alarm" code through the master-identification spread spectrum signal, CSn2. When a lack of response or a jammed signal alarm code from the master unit is encountered, the third and fourth node units may initiate a node unit internal "wait" state, whose period may be derived from each node unit's identification code. After the wait state period, the third and fourth node units may attempt to access it again. Since wait states may be highly unique to each node unit, it is unlikely that the third and fourth node units will jam each other again.

The timing structure illustrated in FIG. 4 for the communication mode serves as example only, and is not intended to be restrictive in or to the current embodiment of the invention. The number of address, overhead, and data bits, turnaround, delay, and transmitter turn-on/off times, bit periods, samples, frames and/or slots per second may be different according to the operational mode the system is in (i.e. initialization, identification, communication) as well as the specific implementation of the invention.

Figure 5:
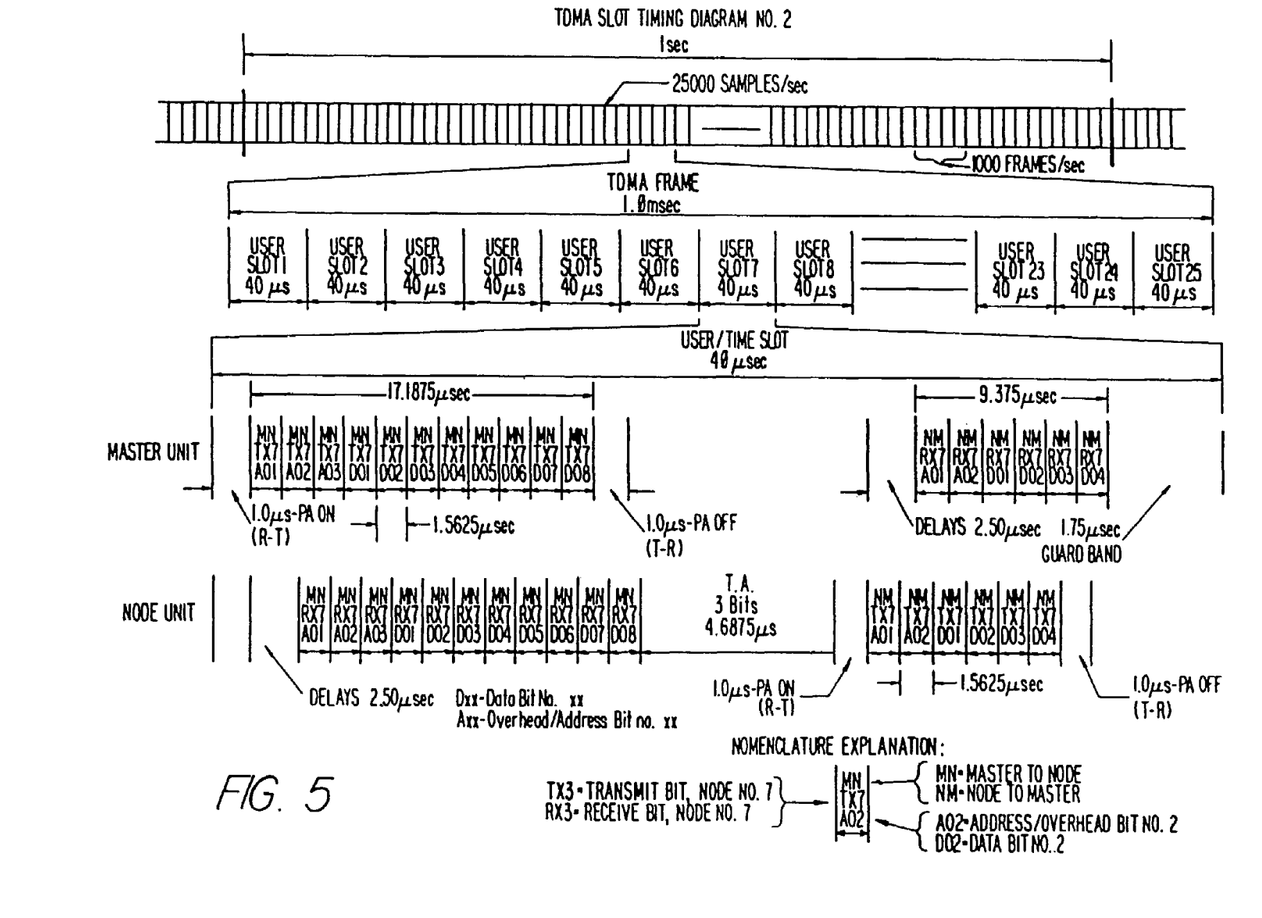
FIG. 5 illustrates the multiple access system timing diagram of a second preferred embodiment using M-ary signaling techniques.

In another embodiment, as illustrated in FIG. 5, the system operates as in the first embodiment (i.e. node units transmit only in response to a master unit transmission of the node unit's code, the K and N−K slots operating the same, etc.) except that the master and node transmit M-ary data bits per code sequence. In this embodiment, there may be 25000 samples per second, divided into 1000 frames per second of 25 time slots of 40 microseconds each, allowing N=25 users to use one time slot 1000 times per second. (See FIG. 5.) The master unit transmits 22 binary data bits (6 overhead/addressing, 16 data) in quaternary operation, where each code sequence transmission represents two binary data bits, or four binary states, which may be represented as:

| Code Sequence Number | Data Bits |
| --- | --- |
| 0 | 00 |
| 1 | 01 |
| 2 | 10 |
| 3 | 11 |

The master-node link therefore yields 16 kbps throughput per slot. In initialization or identification nodes, the data structure of the transmission may be different in order for the handshaking operations to be completed. Node units, which may be embodied as handsets as illustrated in FIG. 1, transmit 22 binary data bits in each time slot (6 overhead/addressing, 16 data), in 16-ary operation, wherein each code sequence transmission represents four binary data bits, or sixteen binary states, which may be represented as:

| Code Sequence Number | Data Bits |
| --- | --- |
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

The node-master unit link therefore yields 16 kbps throughput per slot. In initialization or identification nodes, the data structure of the transmission may be different in order for the handshaking operations to be completed.

The timing structure illustrated in FIG. 5 for the communication mode serves as example only, and is not intended to be restrictive in or the current embodiment of the invention. The number of address, overhead, and data bits, turnaround, delay, and transmitter turn-on/off times, bit period, m-ary operations, samples, frames and/or slots per second may be different according to the operational mode the system is in (i.e. initialization, identification, communication) as well as the specific implementation of the invention.

There are obvious advantages to the M-ary approach. One is more node units per master unit for the same bandwidth. Another is lower receiver complexity in the node units, which allows for a more practical implementation in handheld, battery powered devices such as telephones. For example, in the current embodiment, the node receiver could store fewer spread spectrum codes, reducing its complexity, relying on the master unit to contain more spread spectrum codes and complexity.

Figure 6:
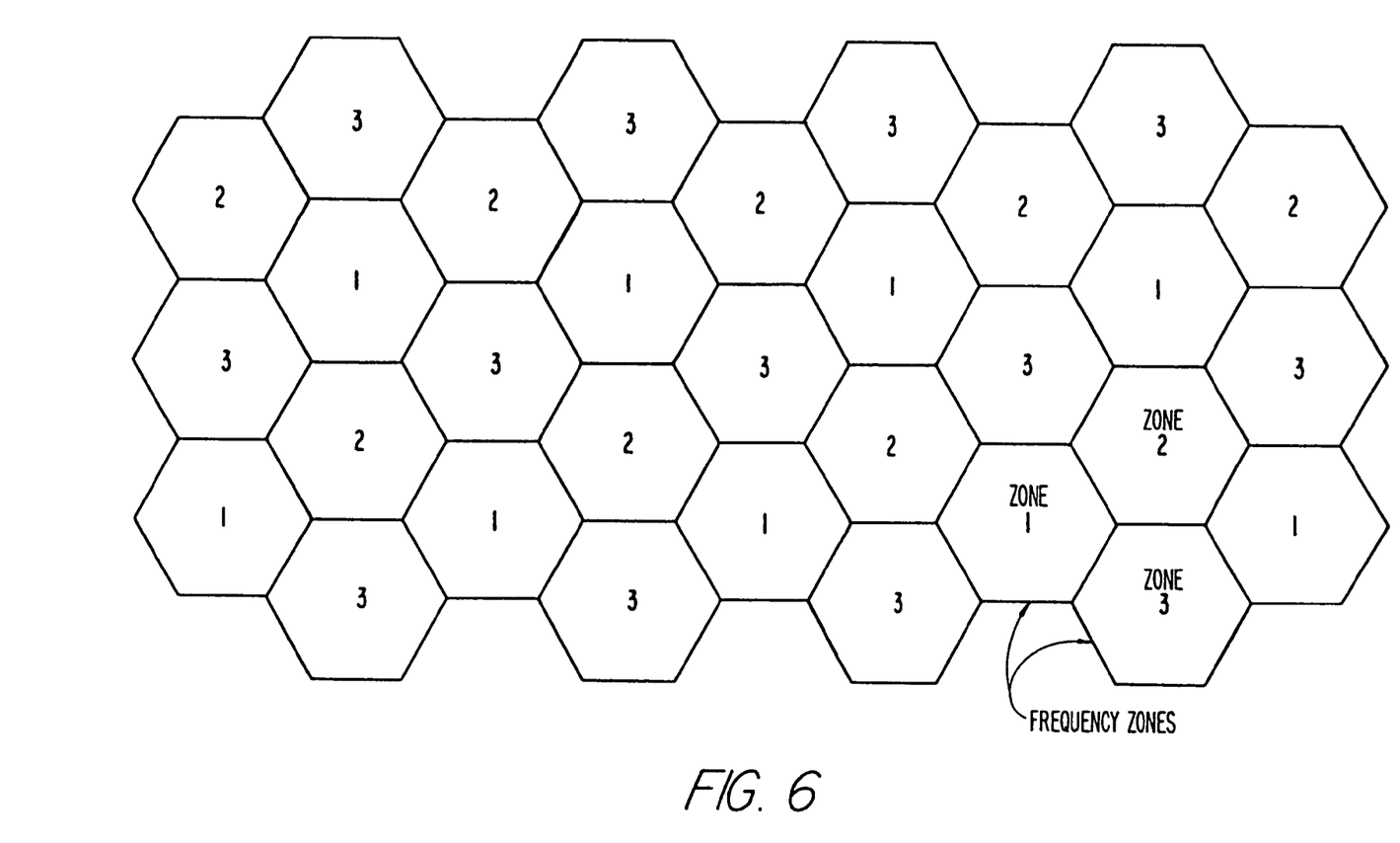
FIG. 6 illustrates an FDMA three frequency master unit network.

The present invention allows for multiple base stations to be situated closely together through the use of frequency offsets in a three frequency zone architecture, as illustrated in FIG. 6. By relying on code division multiplexing, frequency re-use can be employed in every other zone. This requires that node units be able to scan the three frequencies to determine which is used by the master unit whose zone the node is in.

In a second embodiment of the present invention, a fixed, or Fth, time slot, such as the 1st or Nth slots of the plurality of N time slots in a time frame, serves as the access slot. The second method and apparatus comprises the steps of transmitting in the Fth time slot from the master unit the master-initialization spread spectrum signal, CSn1, common to all node units. The Fth time slot may occupy a fixed time slot within the time frame of the N−K unused time slots, and does not change slots as the numbers, K, of node units which have established communications links with the master unit, changes.

In response to receiving the master-initialization spread spectrum signal, CSn1, in the Fth time slot, the (K+1)th node unit transmits in the Fth time slot a (K+1)th node-initialization spread spectrum signal, CSm, which may be the same as CSn1, common to all master units that the (K+1)th node unit may access, which may contain the (K+1)th node unit's identification code.

The master unit receives the node-initialization spread spectrum signal, CSm, in the Fth time slot from the (K+1)th node unit, and transmits in the Fth time slot a master-identification spread spectrum signal, CSn2, which may be distinct from spread spectrum signal CSn1 but common to all X node units, containing the master unit's (K+1)th slot identification code, which may include information directing the (K+1)th node unit as to which time slot and spectrum spreading code to use for communication from the (K+1)th node unit to the master unit.

In response to receiving the master-identification spread spectrum signal, CSn2, the (K+1)th node unit may transmit in the Fth time slot the (K+1)th node-initialization spread spectrum signal, CSm, common to all master units that it may access, which may contain its (K+1)th node unit identification code, which may have a high degree of uniqueness to the plurality of the N−1 other node units.

The master unit receives the (K+1)th node unit's identification code from the (K+1)th node unit in the Fth time slot via the node-initialization spread spectrum signal, CSm, common to all master units accessible by the (K+1)th node unit, and transmits in the (K+1)th time slot a master unit (K+1)th slot communication spread spectrum signal, CMNk+1, generated from a spectrum spreading code derived from the (K+1)th node unit's identification code.

In response to receiving the (K+1)th master unit identification code from the master unit in the Fth time slot via the master-identification spread spectrum signal. CSn2, common to all X node units, the (K+1)th node unit transmits in the (K+1)th time slot a (K+1)th node unit communication spread spectrum signal, CMNk+1, generated from a spectrum spreading code derived from the (K+1)th master-identification code.

As an alternative architecture of the second embodiment, the (K+1)th node unit may transmit the (K+1)th node communication spread spectrum signal in the (K+1)th time slot in response to receiving the master unit (K+1)th slot communication signal in the (K+1)th time slot. In this case, the master-identification spread spectrum signal transmitted in the Fth time slot would not necessarily contain information detailing which time slot of the N−K time slots to use for communication transmissions.

In the second embodiment, the master unit may operate such that it does not transmit in a time slot except to send a plurality of K master unit slot communication spread spectrum signals, CMN1 to CMNK, to K node units which have established communications links with the master unit, plus a master-initialization spread spectrum signal, CSn1, in the case of a search for a new node unit trying to access the master unit, or a master-identification spread spectrum signal, CSn2, in the case of a node unit being in the process of accessing a master unit, in the Fth time slot, leaving N−K−1 time slots unused. If the master unit is transmitting a master-identification spread spectrum signal, CSn2, in the Fth time slot (assuming the (K+1)th node unit is in the process of accessing the system), it then may transmit a master initialization spread spectrum signal, CSn1, in one of the N−K−1 unused time slots, in order to allow the (K+2)th node unit to access the master unit.

If a plurality of up to N−K node units tries to access the master unit sequentially in time, with the period between access attempts being greater than or equal to the frame period, upon reception of the master-initialization spread spectrum signal, CSn1, each node unit of the plurality of N−K node units will access the (K+1)th time slot through the Fth time slot immediately available following its initiation of the access attempts. When the first (K+1)th node unit has accessed the system (assuming the master-identification and (K+1)th node-identification spread spectrum signals are being transmitted in the Fth time slot), the master unit may wait to transmit the (K+2)th master-identification spread spectrum signal until the (K+1)th slot is occupied with master unit-to-(K+1)th node unit and/or (K+1)th node unit-to-master unit communication signals.

If a plurality of up to N−K node units tries to access the master unit instantaneously (the time period between node unit access attempts being less than the frame period), upon reception of the master-initialization spread spectrum signal, CSn1, in the Fth time slot, each node unit of this plurality of node units will transmit a node-initialization spread spectrum signal, CSm, within the same time slot, thus jamming at least one of the node-initialization spread spectrum signals, CSm, at the master unit. If the master unit does not receive a valid initialization signal, CSm, or identification code from a node unit during the time slot, it may cease to transmit any signal in the Fth time slot for a predetermined period of time, or it may transmit a "jammed signal alarm" code through the master-identification spread spectrum signal, CSn2. When a lack of response or a jammed signal alarm code from the master unit is encountered, the node units which tried to access the master unit instantaneously, of the plurality, N−K, of node units, may then initiate a node unit internal "wait" state, whose period may be derived from each node unit's identification code. After the wait state period, the plurality of node units which failed to access the master unit may attempt to access it again. Since wait states may be highly unique to each node unit, it is unlikely that the same plurality of node units will jam each other again.

If all N−1 time slots are being used for communication or initialization functions by N−1 node units, then the master-initialization spread spectrum signal, CSn1, is not transmitted. The master unit may operate such that the Fth time slot may transmit a "busy" alarm to the plurality of N−K node units having not established communications with the master unit such that it informs them that no further access is available at that master unit, thereby allowing only N−1 node units to access the master unit.

In a third embodiment of the present invention, the master unit may function with the initialization, identification, and communication protocols as set forth in the first and second embodiments, but may be configured to transmit the master-initialization spread spectrum signal, CSn1, in a plurality of vacant (N−K) time slots, simultaneously. If the master unit does transmit in a plurality of vacant (N−K) time slots, node units (K+1), (K+2), (K+3), . . . , (K+(N−K)) (or N) may access the master unit in the (K+1)th, (K+2)th, (K+3)th, . . . , (K+(N−K))th (or Nth) time slots, respectively or randomly. Therefore, the (K+1)th node unit trying to access the master unit would access the first time slot immediately available after its initiation of the access attempt, instead of waiting for the (K+1)th or Fth time slot to occur in the next frame.

Thus, if K users are present, the master unit transmits in the 1st through Kth time slots the master unit communication spread spectrum signals, CMN1 through CMNk, pertaining to the 1st through Kth node units, and in the (K+1)th through Nth time slots a master initialization spread spectrum signal, CSn1, common to the plurality, X, of node units that may access the master unit, which may be distinct from all master or node unit communication and identification spread spectrum signals.

If a plurality of up to N−K node units tries to access the master unit sequentially in time, with the period between access attempts being greater than or equal to the slot period, upon reception of the master-initialization spread spectrum signal, CSn1, each node unit will access the open time slot available immediately following its initiation of the access attempt. When the first (K+1)th node unit has accessed the master unit (master unit slot and (K+1)th node unit identification signals are being transmitted in the (K+1)th time slot), the master unit may wait to transmit the (K+2)th through Nth master unit slot identification signals until the (K+1)th slot is occupied with master unit-to-(K+1)th node unit and/or (K+1)th node unit-to-master unit communication signals.

If a plurality of up to N−K node units tries to access the master unit instantaneously (the time period between node unit access attempts being less than the slot period), upon reception of the master-initialization spread spectrum signal, CSn1, each node unit of this plurality of node units will transmit a node-initialization spread spectrum signal, CSm, within the same time slot, thus jamming at least one of the node-initialization spread spectrum signals, CSm, at the master unit. If the master unit does not receive a valid node-initialization spread spectrum signal, CSm, or identification code from a node unit during the time slot, it may cease to transmit any signal in that time slot for a predetermined period of time, or it may transmit a "jammed signal alarm" code through the master unit slot identification signal, CSn2. When a lack of response or a jammed signal alarm code from the master unit is encountered, the node units which tried to access the master unit instantaneously, of the plurality, N−K, of node units, may initiate a node unit internal "wait" state, whose period may be derived from each node unit's identification code. After the wait state period, the plurality of node units which failed to access the master unit may attempt to access it again. Since wait states may be highly unique to each node unit, it is unlikely that the same plurality of node units will jam each other again.

If all N time slots are being used for communication or initialization functions by N node units, then the initialization spread spectrum signal, CSn1, is not transmitted by the master unit, and no new node units of the plurality of X−N units may access the master unit. The master unit may operate such that the Nth time slot may transmit a "busy" alarm to the plurality of N−K node units having not established communications with the master unit such that it informs then that no further access is available at that master unit, thereby allowing only N−1 node units to access the master unit.

It will be apparent to those skilled in the art that various modifications can be made to the method for establishing spread spectrum communications between a master unit and a plurality of node units of the present invention, without departing from the scope or spirit of the invention, and it is intended that the present invention cover modifications and variations of the method for establishing spread spectrum communications as described herein, provided they come within the scope of the appended claims and their equivalents.

We claim:

1. A method for communicating in a wireless system, the method comprising:

establishing wireless communications between a master unit and one or more node units using a spread spectrum signal which uses one or more common signaling spectrum spreading codes to manage handshaking between the master unit and the node units, without the use of a separate frequency channel for common signaling and without requiring a separate time channel for common signaling, wherein establishing wireless communications between the master unit and a first node unit comprises transmitting a master unit identification code from the master unit to the first node units generated from a spectrum spreading code derived from an identification code of the first node unit.

2. The method of claim 1 wherein the master unit comprises a base station and wherein the one or more nodes comprise mobile communication devices.

3. The method of claim 1 wherein establishing wireless communications comprises:

transmitting a master-initialization spread spectrum signal including a master-common-signaling chip code to the one or more node units.

4. The method of claim 1 wherein establishing wireless communication comprises:

transmitting a first node-initialization spread spectrum signal which includes a node-common-signaling chip code to the master unit.

5. The method of claim 4 wherein establishing wireless communication further comprises:

transmitting a node-identification code to the master unit using a second node-initialization spread spectrum signal.

6. A mobile communication device adapted to establish wireless communications with a base station using a spread spectrum signal which uses one or more common signaling spectrum spreading codes to manage handshaking between the base station and the mobile communication device, without the use of a separate frequency channel for common signaling and without requiring a separate time channel for common signaling, and wherein the mobile communication device is configured to identify the base station based on a master unit identification code received during handshaking generated from a spectrum spreading code derived from an identification code of the mobile communication device.

7. The mobile communication device of claim 6 wherein the spread spectrum signal comprises a code-division multiple access (CDMA) time-division multiplexed (TDM) signal.

8. The mobile communication device of claim 6 further adapted to transmit a first node-initialization spread spectrum signal including a node-common-signaling chip code in response to receiving a master-initialization spread spectrum signal from the base station including a master-common-signaling chip code.

9. The mobile communication device of claim 8 further adapted to transmit a second node-initialization spread spectrum signal including a node-identification code to the base station.

10. A base station adapted to establish wireless communications with one or more mobile units using spread spectrum signals which use one or more common signaling spread spectrum spreading codes to manage handshaking between the base station and the one or more mobile units without the use of a separate frequency channel for common signaling and without requiring a separate time channel for common signaling, and wherein during the handshaking, the base station is adapted to transmit a master unit identification code to a first mobile unit generated from a spectrum spreading code derived from an identification code of the first unit.

11. The base station of claim 10 wherein the spread spectrum signals comprise code-division multiple access (CDMA) time-division multiplexed (TDM) signals.

12. The base station of claim 10 further adapted to transmit a master-initialization spread spectrum signal including a master-common-signaling chip code to the one or more mobile units.

* * * * *